US008681199B2

(12) United States Patent
Lee (10) Patent No.: US 8,681,199 B2
(45) Date of Patent: Mar. 25, 2014

(54) METHOD OF PROVIDING VIDEO-CALL SERVICE USING GENERAL VOICE-CALL TERMINAL AND PRIVATE BRANCH EXCHANGE FOR PERFORMING THE METHOD

(75) Inventor: Sang-Hee Lee, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1776 days.

(21) Appl. No.: 11/878,128

(22) Filed: Jul. 20, 2007

(65) Prior Publication Data

US 2008/0111880 A1    May 15, 2008

(30) Foreign Application Priority Data

Nov. 10, 2006    (KR) .................. 10-2006-0111131

(51) Int. Cl.
*H04N 7/14* (2006.01)
(52) U.S. Cl.
USPC ................................... 348/14.01; 348/14.11
(58) Field of Classification Search
USPC .................. 348/14.01–14.09, 14.1, 14.11
See application file for complete search history.

(56) References Cited

U.S. PATENT DOCUMENTS

| | | | | |
|---|---|---|---|---|
| 7,711,370 | B2 * | 5/2010 | Schessel et al. | 455/442 |
| 2004/0008837 | A1 * | 1/2004 | Sylvain | 379/265.09 |
| 2006/0209810 | A1 * | 9/2006 | Krzyzanowski et al. | 370/356 |
| 2008/0013540 | A1 * | 1/2008 | Gast | 370/392 |

* cited by examiner

*Primary Examiner* — Brandon Miller
(74) *Attorney, Agent, or Firm* — H.C. Park & Associates, PLC (57) ABSTRACT

In a method of providing video-call service using a general voice-call terminal and a Private Branch Exchange (PBX) for performing the method, the following steps or functions are performed: exchanging, at a PBX, video media information with a video-support adaptor for providing video-call service to a voice-call terminal; and exchanging, at the PBX, moving picture media information to be used by the voice-call terminal and the video-support adaptor with a counterpart video-call terminal so as to establish a session between the video-support adaptor and the counterpart video-call terminal. The PBX includes a call processor and a Session Initiation Protocol (SIP) agent. It is possible to provide video-call service between a conventional terminal not having a video screen and various videophone apparatuses by interworking the conventional terminal with SIP-based video software or hardware.

18 Claims, 10 Drawing Sheets

METHOD OF PROVIDING VIDEO-CALL SERVICE USING GENERAL VOICE-CALL TERMINAL AND PRIVATE BRANCH EXCHANGE FOR PERFORMING THE METHOD

CLAIM OF PRIORITY

This application makes reference to, incorporates the same herein, and claims all benefits accruing under 35 U.S.C. §119 from an application for METHOD OF PROVIDING VIDEO-CALL SERVICE USING GENERAL VOICE-CALL TERMINAL AND PRIVATE BRANCH EXCHANGE FOR PERFORMING THE METHOD earlier filed in the Korean Intellectual Property Office on the $10^{th}$ of Nov. 2006 and there duly assigned Serial No. 2006-0111131.

BACKGROUND OF THE INVENTION

1. Technical Field

The present invention relates to a method of providing video-call service using a general voice-call terminal and a Private Branch Exchange (PBX) for performing the method.

2. Related Art

As more and more voice communication networks are employing a packet switching technique rather than a circuit switching technique, and Internet Protocol (IP)-based communication is becoming increasingly widespread, Session Initiation Protocol (SIP) is becoming a main standard of IP-based communication. In addition, due to efforts to provide a service differentiated from conventional voice communication service in an IP network, a variety of SIP-based video communication equipment and solutions are appearing. In order to use such SIP-based video communication service, all terminals not supporting SIP video must be replaced.

In a conventional Private Branch Exchange (PBX), a digital phone and an analog phone based on a circuit serving only voice, a packet-based IP voice communication terminal, a native-protocol video communication terminal not supporting SIP, an SIP-supported videophone terminal, etc. can interwork with each other. In this case, the PBX is connected to its own or an external media gateway, an SIP proxy server, etc., and can provide voice-call service between all terminals, and video-call service between videophones using the same protocol.

According to the conventional art, terminals need to be replaced to provide video-call service to a user of a telephone that does not have a video screen. In addition, a method of providing video-call service between an IP videophone terminal not supporting SIP and an SIP videophone terminal has not yet been provided.

SUMMARY OF THE INVENTION

It is an objective of the present invention to provide a method of providing Session Initiation Protocol (SIP)-based video-call service using software or a hardware terminal providing SIP video (i.e., a video-support adaptor), while using a conventional voice-call terminal in a Private Branch Exchange (PBX) network.

In accordance with a first aspect of the present invention, a method of providing video-call service using a PBX comprises the steps of: exchanging, at the PBX, video media information with a video-support adaptor for providing video-call service to a voice-call terminal; and exchanging, at the PBX, moving picture media information to be used by the voice-call terminal and the video-support adaptor with a video-call terminal so as to establish a session between the video-support adaptor and the video-call terminal.

In this respect, the method may further comprise the steps of: relaying, at the PBX, video media data between the video-support adaptor and the video-call terminal; and relaying, at the PBX, audio media data between the voice-call terminal and the video-call terminal.

In addition, the moving picture media information to be used by the voice-call terminal and the video-support adaptor may include audio media information according to a format of audio packet data to be transferred by the PBX to the video-call terminal, and video media information according to a format of video media data provided by the video-support adaptor.

The voice-call terminal may include at least one of an analog voice telephone terminal, a digital voice telephone terminal, and a Voice over Internet Protocol (VoIP) voice telephone terminal, and the video-call terminal may include a terminal providing video-call service using SIP or a terminal providing video-call service using a native protocol.

The step of exchanging, at the PBX, video media information with the video-support adaptor may comprise transferring, by the video-support adaptor to the PBX, a session setup request message (i.e., an INVITE message) including video media information.

The method may further comprise the steps of storing, at the PBX, the moving picture media information according to the voice-call terminal and the video-support adaptor in a database, and managing it.

In accordance with a second aspect of the present invention, a method of providing video-call service using a PBX comprises the steps of: transferring, by a first video-support adaptor interworking with a first voice terminal to the PBX, a session setup request message, and transferring, at the PBX, a ring signal to a second voice terminal which is a destination terminal; when there is a response from the second voice terminal, transferring, at the PBX, moving picture media information of a second video-support adaptor interworking with the second voice terminal to the first video-support adaptor; and performing, at the first video-support adaptor, session establishment together with the second video-support adaptor using the moving picture media information.

In this respect, in the step of transferring moving picture media information of the second video-support adaptor to the first video-support adaptor, an alternative response message, including the moving picture media information of the second video-support adaptor, may be transferred to the first video-support adaptor.

In accordance with a third aspect of the present invention, a method of providing videoconferencing service using a PBX comprises the steps of: exchanging, at the PBX, video media information with a video-support adaptor for providing video-call service to a voice-call terminal; transferring, at the PBX, an SIP message including moving picture media information to be used by the video-support adaptor to a multimedia conference (MMC) server; and relaying, at the PBX, video media data between the video-support adaptor and the MMC server, and audio media data between the voice-call terminal and the MMC server.

In accordance with a fourth aspect of the present invention, a PBX for providing video-call service comprises: a call processor for checking audio media information to be received and converted from a voice-call terminal, and video media information supported by a video-support adaptor for providing video-call service to the voice-call terminal, and for transferring the audio and video media information to an SIP agent. The SIP agent exchanges moving picture media information to be used by the voice-call terminal and the video-support adaptor with a counterpart terminal so as to establish a session between the video-support adaptor and the counterpart terminal.

The PBX may further comprise: a terminal register for registering a voice-call terminal provided with video-call service through a video-support adaptor using SIP; and a terminal information database for storing moving picture media information of the voice-call terminal provided with video-call service through the video-support adaptor.

In addition, the call processor may establish only a voice-call session between the voice-call terminal and the counterpart terminal when the counterpart terminal does not support video-call service. The call processor may exchange audio data with a terminal not supporting SIP, and the SIP agent may exchange audio data with a terminal supporting SIP using SIP, thereby performing a voice call between the terminal not supporting SIP and the terminal supporting SIP. Furthermore, the SIP agent may include the moving picture media information, received from the call processor to be used by the voice-call terminal and the video-support adaptor, in at least one of a session setup request message, a 200 OK message, and a 380 alternative response message, and may transfer it to the counterpart terminal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the present invention will be described in detail with reference to the accompanying drawings. In the following disclosure, a detailed description of known functions and configurations incorporated herein has been omitted for conciseness. The following description will be made regarding exemplary embodiments in which the present invention is applied to a method and a Private Branch Exchange (PBX) for providing video-call service. It should be noted that the following exemplary embodiments are provided merely to assist in an understanding the present invention, but are not to be interpreted as limiting the scope of the present invention.

Figure 1:
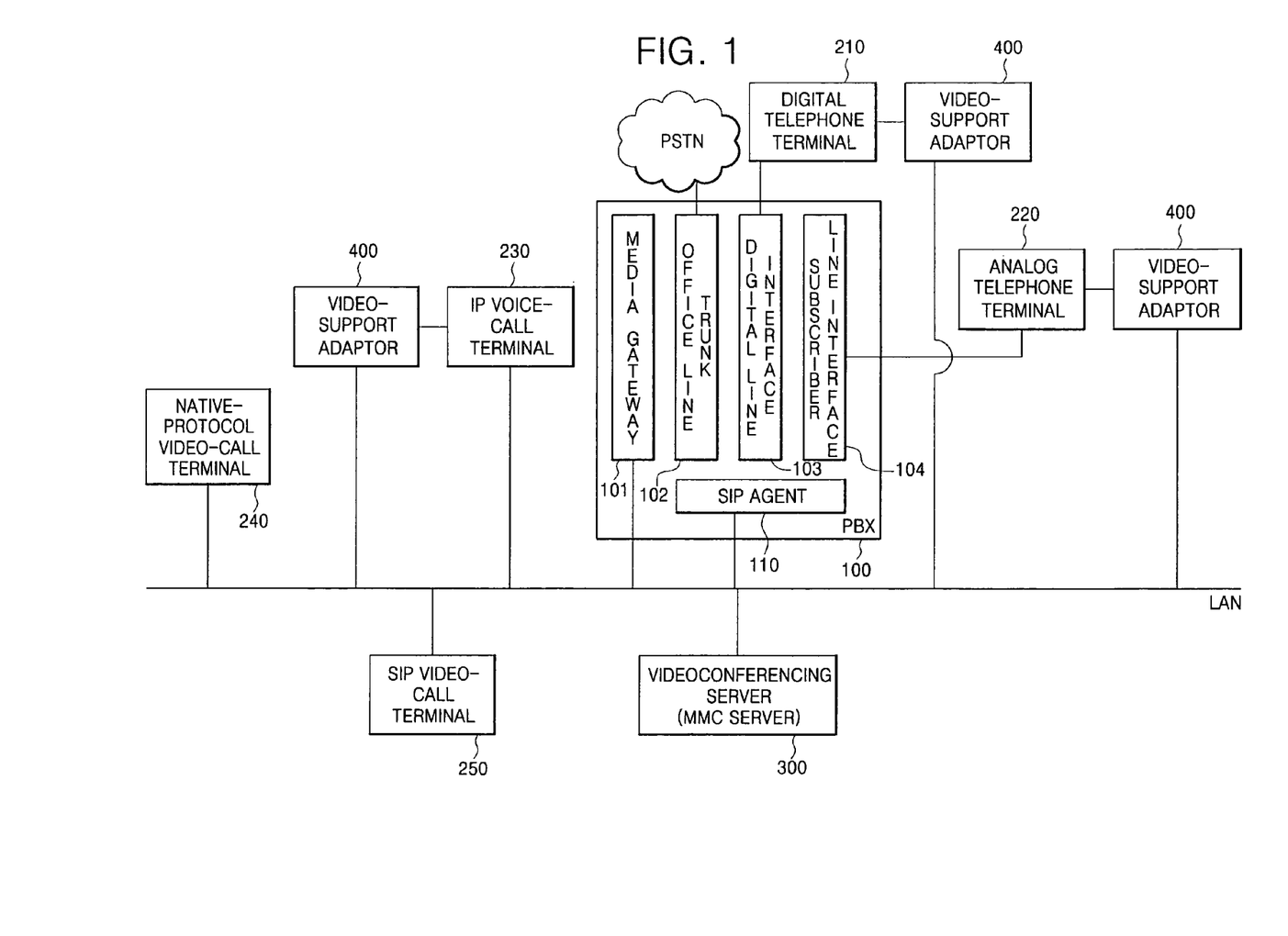
FIG. 1 is a block diagram illustrating the constitution of a network for providing videophone service according to an exemplary embodiment of the present invention.

FIG. 1 is a block diagram illustrating the constitution of a network for providing videophone service according to an exemplary embodiment of the present invention.

Referring to FIG. 1, the network for providing videophone service according to an exemplary embodiment of the present invention comprises a PBX 100 and a video conferencing or multimedia conference (MMC) server 300. In addition, an Internet Protocol (IP) voice-call terminal 230, a digital telephone terminal 210, an analog telephone terminal 220, a native-protocol-based video-call terminal 240, a Session Initiation Protocol (SIP) video-call terminal 250, and the like are connected to the PBX 100, thereby providing voice and video-call service to users.

First, characteristics of telephones connected to the PBX 100 will be described. Among the telephone terminals, the native-protocol-based video-call terminal 240 and the SIP video-call terminal 250 can fundamentally provide video-call service. In this regard, the SIP video-call terminal 250 provides video-call service to a user using SIP, and the native-protocol-based video-call terminal 240 provides video-call service to a user using its native protocol other than SIP. The native-protocol-based video-call terminal 240 and the SIP video-call terminal 250 provide packet-based data service, and are thus connected to a local area network (LAN).

In addition, the digital telephone terminal 210, the analog telephone terminal 220 and the IP voice-call terminal 230 can provide only voice-call service. All three terminals will be referred to as voice-call terminals. The voice-call terminals must interwork with a video-support adaptor 400 to provide video-call service to users.

The digital telephone terminal 210 provides digital voice phone service, and is matched with a digital line interface (DLI) 103 of the PBX 100. The analog telephone terminal 220 provides analog voice phone service, and is connected to a subscriber line interface (SLI) 104 of the PBX 100. The IP voice-call terminal 230 provides packet-based voice phone service, and is thus connected to a LAN (not shown) for packet exchange. In general, the IP voice-call terminal 230 may be considered to be a Voice over Internet Protocol (VoIP) phone. The video-support adaptor 400, which provides video-call service to the digital telephone terminal 210, the analog telephone terminal 220 and the IP voice-call terminal 230, will be described below.

The video-support adaptor 400 is connected to the digital telephone terminal 210, the analog telephone terminal 220 and the IP voice-call terminal 230, and is also connected to a LAN (not shown) for packet-based data transmission and reception. The digital telephone terminal 210, the analog telephone terminal 220, and the IP voice-call terminal 230 do not have a means for outputting an image and a means for exchanging video data, and thus cannot perform a video call. The video-support adaptor 400 includes moving-picture-playback software or hardware capable of displaying video to a user. In addition, the video-support adaptor 400 can establish a session for transmitting and receiving video media data using SIP.

The PBX 100 serves to relay audio and video data for video-call service. The PBX 100 controls call setup or session establishment for providing videophone service between terminals that use different protocols, and serves to relay a media data packet.

The MMC server 300 provides videoconferencing service. In general, the MMC server 300 supports mixing of SIP-based audio and video data, and has the same constitution as a conventional videoconferencing server.

Figure 2:
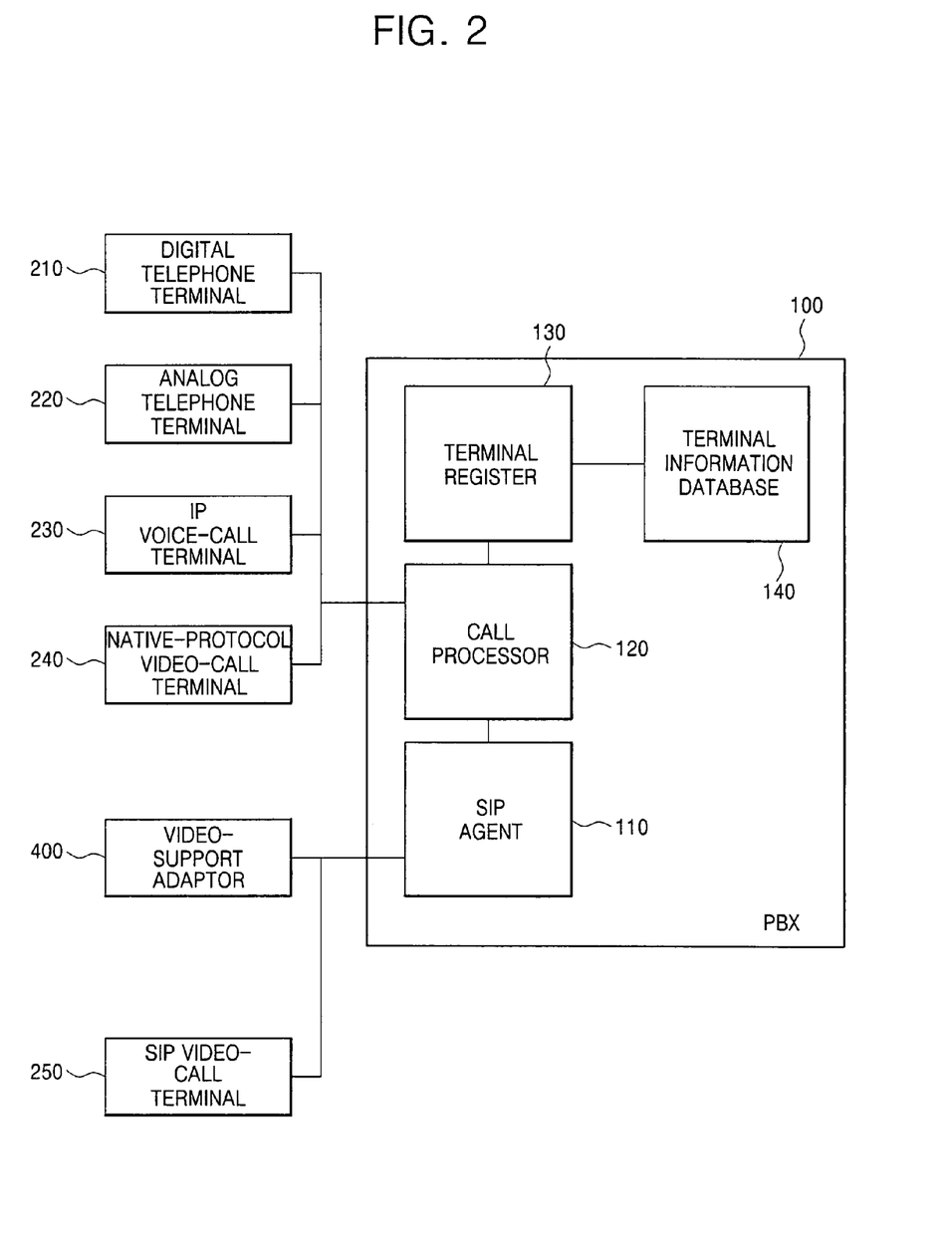
FIG. 2 is a block diagram illustrating the constitution of a Private Branch Exchange (PBX) included in the network of FIG. 1.

FIG. 2 is a block diagram illustrating the constitution of the PBX included in the network of FIG. 1.

Referring to FIG. 2, the PBX 100 comprises an SIP agent 110, a call processor 120, a terminal register 130, and a terminal information database 140.

The terminal register 130 registers a terminal provided with video-call service from the video-support adaptor 400. When receiving a register message for registering a terminal, the terminal register 130 checks a user agent header. When it is determined from the header that the voice-call terminals 210, 220 and 230 request registration of the video-support adaptor 400, the terminal register 130 registers each of the voice-call terminals 210, 220 and 230 in the terminal information database 140 as a type of terminal using the video-support adaptor 400. The type of terminal using the video-support adaptor 400 may be defined as a V-CLT type. When it is determined from the header that the PBX 100 does not support a protocol requested by the terminal transmitting the register message, the terminal register 130 may forward the register message to an external proxy server for processing.

The call processor 120 provides video-call service and videoconferencing service appropriate for the type of terminal. The call processor 120 first determines whether or not a destination terminal requested for a video call can perform the video call.

When the destination terminal cannot perform a video call, the call processor 120 establishes a session for only a voice call between an originating terminal and the destination terminal. When the destination terminal can perform a video call using SIP, the call processor 120 transfers, to the SIP agent 110, video and audio media data of the originating terminal and the destination terminal so as to establish an SIP session. However, when the destination terminal uses its native protocol rather than SIP, the call processor 120 performs call processing together with the destination terminal. Needless to say, the protocol of the destination terminal must be supported by the call processor 120.

The SIP agent 110 serves to process a message according to an SIP standard in order to provide video-call service between the originating terminal and the destination terminal. The SIP agent 110 controls session establishment in different ways according to whether or not a terminal supports SIP.

When video-call service is required between terminals supporting SIP, the SIP agent 110 serves only to transfer, to each terminal, video and audio media data for establishing an SIP session. The terminals processing the data exchange a session setup request message (i.e., an INVITE message) with each other, thereby establishing a videophone service session.

Session control between a terminal not supporting SIP and a terminal supporting SIP is a little different from the above case. In this case, the SIP agent 110, as a substitute for the terminal not supporting SIP, establishes a session together with the terminal supporting SIP. Using the session, it is possible to exchange audio and video media data between the terminal supporting SIP and the PBX 100. Meanwhile, the terminal not supporting SIP transfers and receives audio and video data to and from the call processor 120 of the PBX 100 using its native protocol. In other words, the SIP agent 110 and the call processor 120 serve as relay equipment between the two terminals.

Operations of the call processor 120 and the SIP agent 110 for providing videoconferencing service will be described below. A videoconferencing request message transferred from a video terminal supporting SIP is sent to the call processor 120 via the SIP agent The videoconferencing request message transferred from a video terminal not supporting SIP is directly sent to the call processor 120.

Using the terminal information database 140, the call processor 120 determines whether the terminal transferring the videoconferencing request message and a counterpart terminal support videoconferencing service. Since a plurality of persons participate in the videoconference, the number of counterpart terminals receiving the videoconferencing request is at least one, and the call processor 120 determines whether or not each counterpart terminal supports videoconferencing service. The call processor 120 searches for information on terminals to participate in the videoconference, and transfers that information to the SIP agent 110.

The SIP agent 110 composes an SIP message with the information received from the call processor 120, and transfers the SIP message to the MMC server 300 for providing videoconferencing service. The MMC server 300 processes the videoconferencing request, and generates and transfers a required SIP message to the SIP agent 110.

The SIP agent 110 sends the SIP message received from the MMC server 300 to an IP video terminal not supporting SIP via the call processor 120, and directly transfers the SIP message to a video terminal supporting SIP.

When the SIP agent 110 does not have an SIP server function, the SIP message may be transferred between the SIP agent 110 and the MMC server 300 via an external SIP server (not shown). The call processor 120 generates environmental information (i.e., an interface address and a codec) allowing terminals not supporting SIP to exchange audio and video with a videoconferencing server. In other words, the PBX 100 and a terminal not supporting SIP perform communication using a native protocol of the terminal, and the SIP message is exchanged between the PBX 100 and the MMC server 300 using the SIP agent 110.

After the conference is started, audio/video media data is directly exchanged between a terminal supporting SIP and the MMC server 300 because a session is directly established between them using SIP. Meanwhile, exchange of audio/video media data between a terminal not supporting SIP and the MMC server 300 requires the intervention of the PBX 100. More specifically, media data are exchanged between the terminal not supporting SIP and the call processor 120 of the PBX 100 according to a protocol which the terminal not supporting SIP uses. In addition, the media data are exchanged between the SIP agent 110 of the PBX 100 and the MMC server 300 using SIP. In other words, the PBX 100 serves as relay equipment between the terminal not supporting SIP and the MMC server 300. Methods of establishing a session between each type of terminal will be described in detail below.

Figure 3:
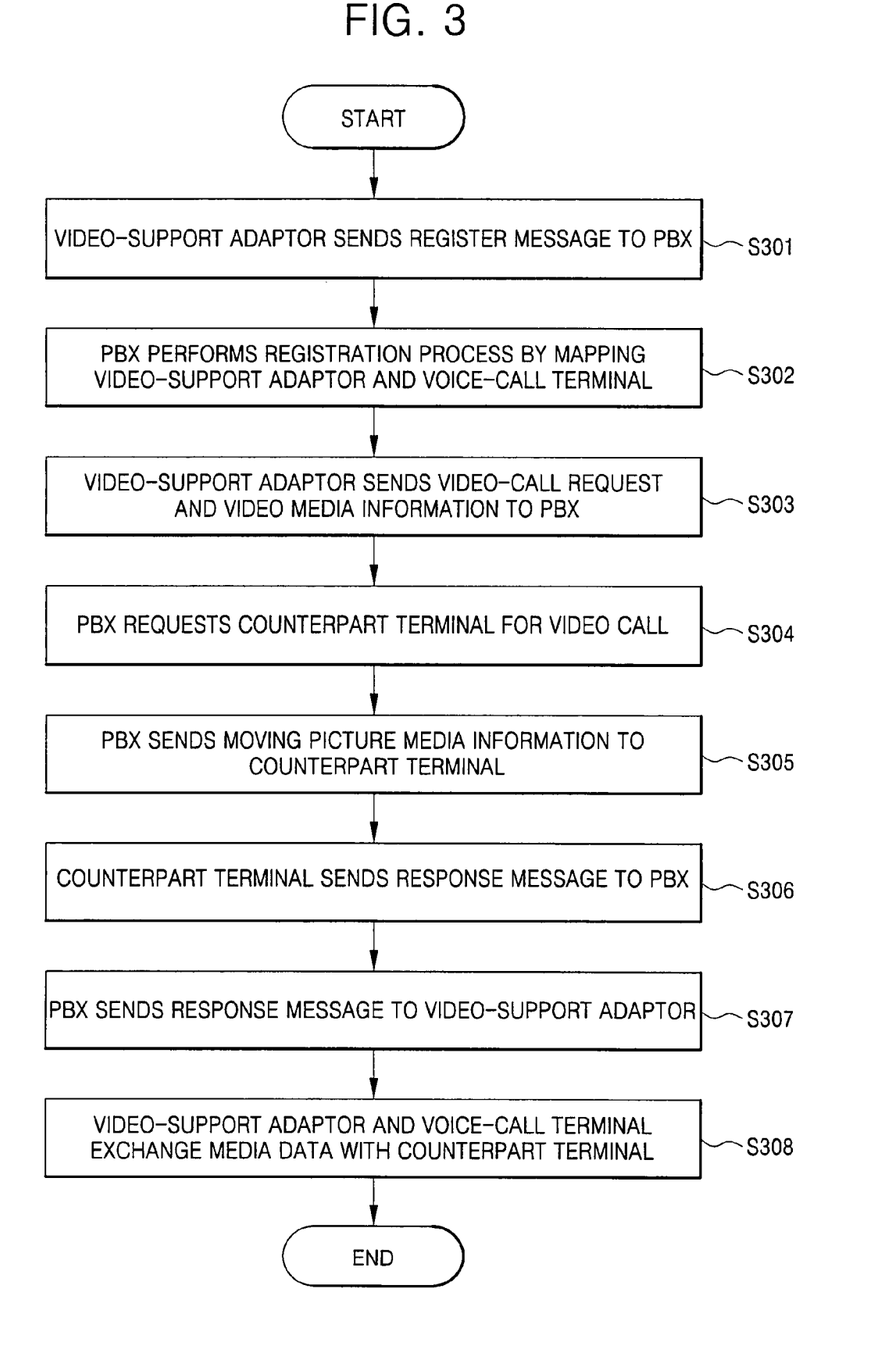
FIG. 3 is a flowchart of a method of establishing a session between a voice-call terminal using a video-support adaptor and a general video-call terminal according to another exemplary embodiment of the present invention.

FIG. 3 is a flowchart of a method of establishing a session between a voice-call terminal using a video-support adaptor and a general video-call terminal according to another exemplary embodiment of the present invention.

A PBX receives a register message from a video-support adaptor for providing video-call service to a voice-call terminal (step S301). In the present invention, the video-support adaptor uses SIP, and thus an SIP agent of the PBX receives the register message.

Then, a terminal register of the PBX registers the video-support adaptor (step S302). In other words, the terminal register maps which voice-call terminal in a private network is connected to the video-support adaptor, and records the information in a terminal information database.

Subsequently, the video-support adaptor makes a request to the PBX for a video call, and transfers video media information required for the video call (step S303). The video media information may be included in a session setup request message (i.e., an INVITE message) transferred from the video-support adaptor to the PBX.

The PBX receiving the session setup request message combines the video media information and audio media information, and requests a counterpart terminal for the video call (step S304). Here, the method of requesting the video call may be determined according to a protocol of the counterpart terminal, which will be described in detail with reference to FIGS. 4 thru 6. Then, the PBX transfers moving picture media information (i.e., the audio media information and the video media information) received from an originating terminal to the counterpart terminal (step S305).

Subsequently, the counterpart terminal responds to the video-call request from the PBX (step S306), and the PBX receiving the response sends a response, reporting that the session is established, to the video-support adaptor (step S307). After the session for transferring moving picture data is established as described above, the two terminals transfer media data (step S308).

Figure 4:
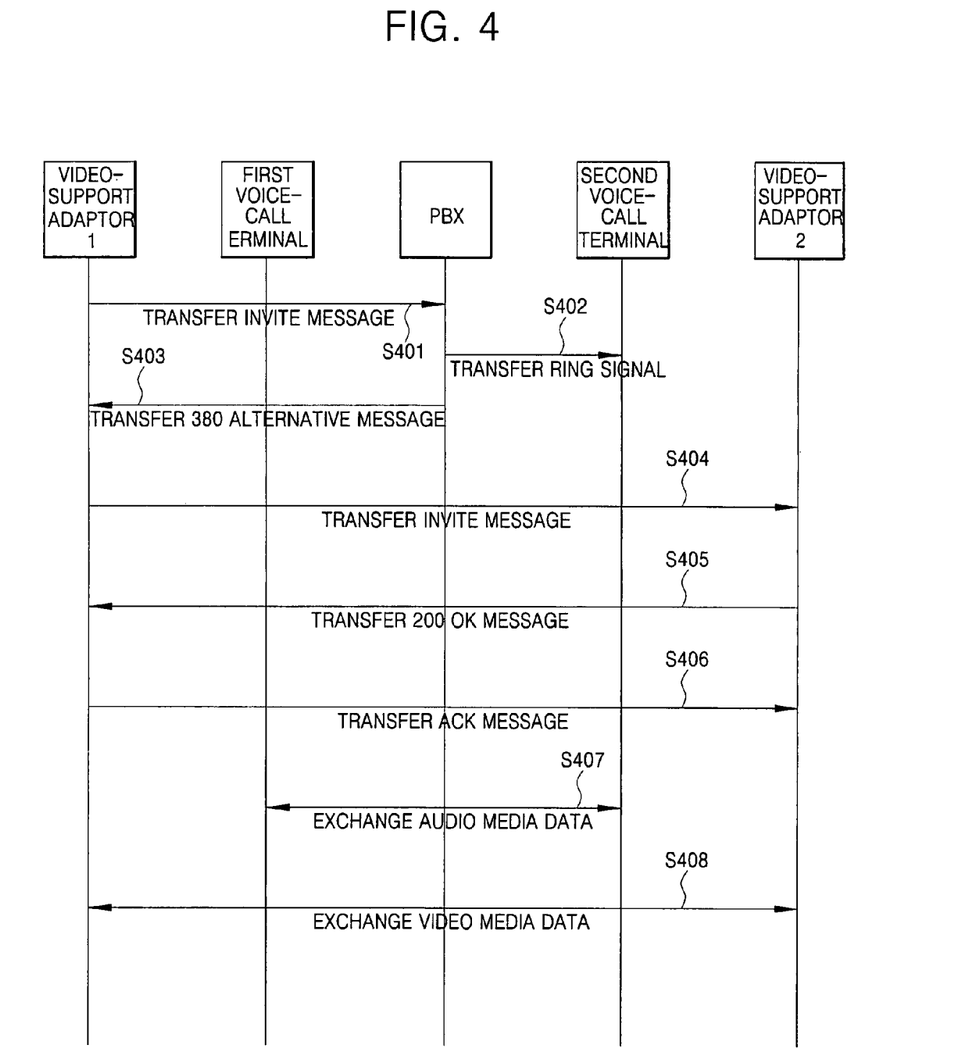
FIG. 4 is a flowchart of a method of establishing a session between terminals using video-support adaptors according to another exemplary embodiment of the present invention.

FIG. 4 is a flowchart of a method of establishing a session between terminals using video-support adaptors according to another exemplary embodiment of the present invention.

In this regard, it is assumed that the phone number of a first voice-call terminal, which is an originating terminal, is 2001, and the phone number of a second voice-call terminal, which is a destination terminal, is 2002. Since the first and second voice-call terminals do not fundamentally support a video call, they establish a session using video-support adaptors 1 and 2, respectively.

Video-support adaptor 1 sends a video-call invite message (i.e., an INVITE message) to a PBX (step S401). The invite message may be expressed as "INVITE sip:2002@SIPE-PBX." Here, "SIPE-PBX" indicates a PBX according to the present invention.

SIPE-PBX sends a ring signal to the second voice-call terminal (step S402). Since the second voice-call terminal provides video-call service via video-support adaptor 2, an SIP session between video-support adaptor 1 and the PBX is not necessary. Therefore, the PBX disconnects a video-call request call using a 380 alternative response message (step S403). In the latter regard, the alternative response message includes video media information of video-support adaptor 2.

Subsequently, video-support adaptor 1 makes a direct request to video-support adaptor 2 for a session using the video media information of the video-support adaptor 2 received in step S403 (step S404). In this regard, the transferred message is "INVITE sip:2002@SIPE-PBX."

When a user responds at the second terminal, an answer event occurs at the PBX, and video-support adaptor 2 sends a 200 OK message to video-support adaptor 1 (step S405). Then, video-support adaptor 1 sends an ACK message to video-support adaptor 2, thereby completing session establishment (step S406).

Subsequently, the first and second voice-call terminals directly process an audio signal (step S407), and video-support adaptors 1 and 2 exchange video media data using SIP (step S408), thereby providing videophone service to users.

Figure 5:
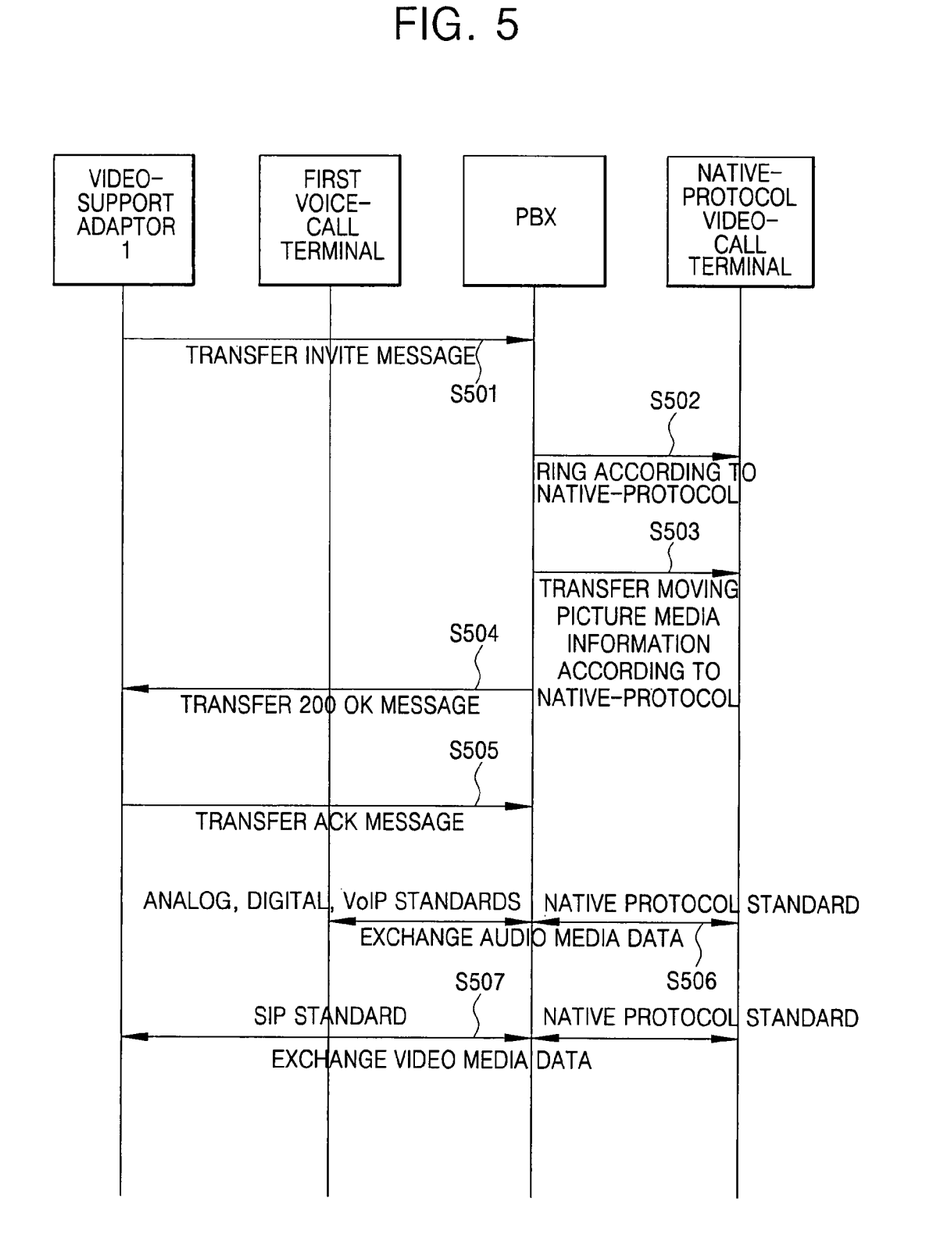
FIG. 5 is a flowchart of a method of establishing a session between a terminal using a video-support adaptor and a video terminal not supporting Session Initiation Protocol (SIP) according to another exemplary embodiment of the present invention.

FIG. 5 is a flowchart of a method of establishing a session between a terminal using a video-support adaptor and a video terminal not supporting SIP according to another exemplary embodiment of the present invention.

As in the previous exemplary embodiment, it is assumed that the phone number of a first voice-call terminal, which is an originating terminal, is 2001, and the phone number of a native-protocol video-call terminal, which is a destination terminal, is 2002. Since the first voice-call terminal does not fundamentally support a video call, it provides videophone service using video-support adaptor 1. On the other hand, the native-protocol video-call terminal not supporting SIP provides videophone service to a user using its native protocol.

Video-support adaptor 1 sends a video-call invite message (i.e., an INVITE message) to a PBX (step S501). The invite message may be expressed as "INVITE sip:2002@SIPE-PBX." The PBX makes the native-protocol video-call terminal ring (step S502). When a user of the native-protocol video-call terminal responds to the ringing, the PBX sends video media information of video-support adaptor 1 to the native-protocol video-call terminal (step S503). Steps S502 and S503 are performed according to a native protocol of the native-protocol video-call terminal other than SIP. Therefore, steps 502 and 503 may be performed in a different sequence and in combination with each other according to a standard of the native protocol.

Meanwhile, the PBX sends to the first terminal a 200 OK message including video media information of the native-protocol video-call terminal (step S504). In other words, the first and second terminals exchange moving picture media information by transferring messages in steps S503 and S504.

Then, video-support adaptor 1 sends an ACK message to the PBX (step S505), thereby completing session establishment between the originating terminal and the destination terminal. In this exemplary embodiment shown in FIG. 5, the native-protocol video-call terminal does not support SIP, and thus an SIP session cannot be directly established between the video-support adaptor 1 and the native-protocol video-call terminal. Therefore, an SIP session between video-support adaptor 1 and the PBX must be continuously maintained, which is different from the exemplary embodiment shown in FIG. 4.

Subsequently, the first voice-call terminal and the native-protocol video-call terminal exchange audio and video media data with each other (steps S506 and S507). Here, the audio and video media data are transferred and received via the PBX.

Figure 6:
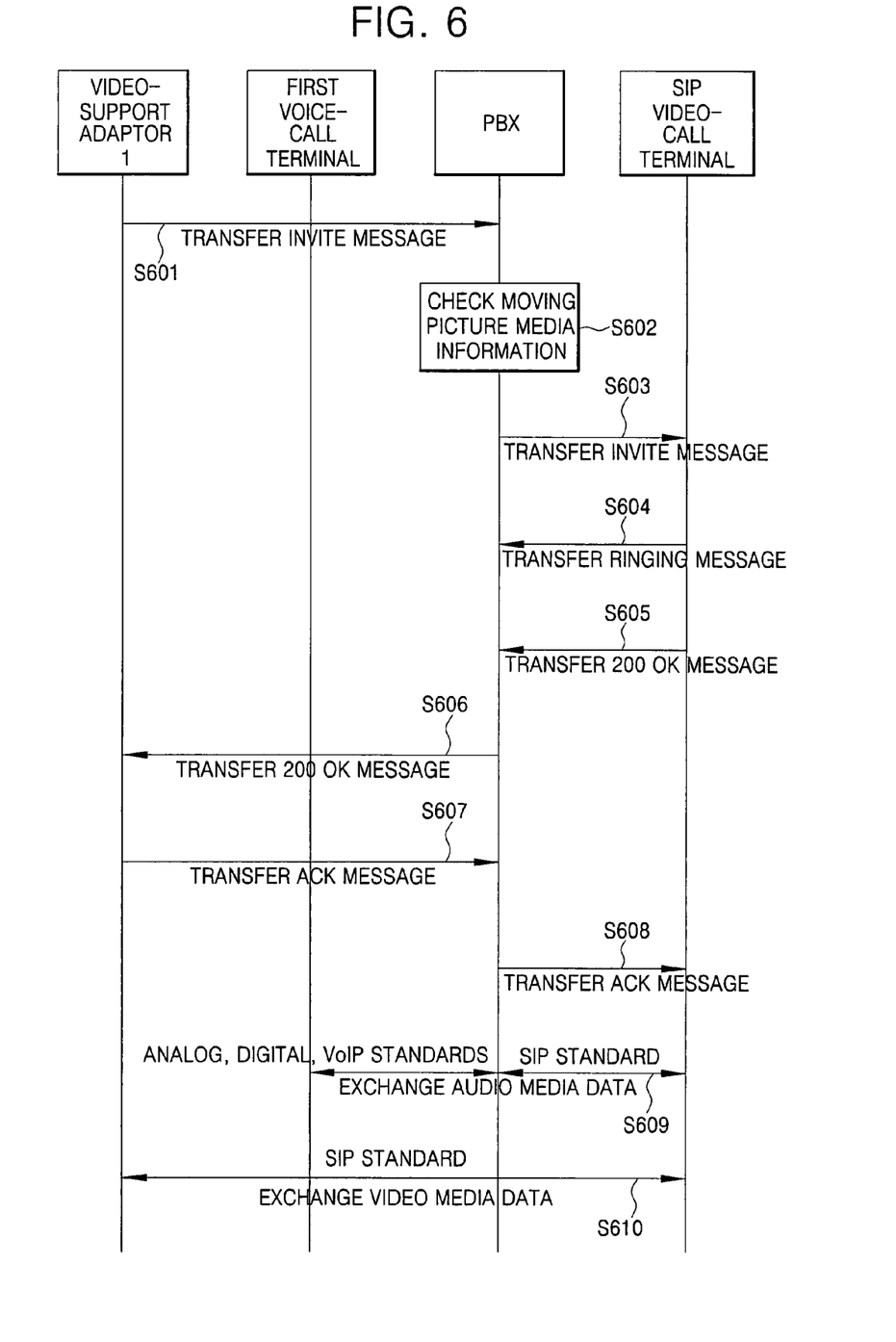
FIG. 6 is a flowchart of a method of establishing a session between a terminal using a video-support adaptor and an SIP video terminal according to yet another exemplary embodiment of the present invention.

FIG. 6 is a flowchart of a method of establishing a session between a terminal using a video-support adaptor and an SIP video terminal according to yet another exemplary embodiment of the present invention.

A first voice-call terminal does not fundamentally support a video call, thus providing videophone service using video-support adaptor 1. On the other hand, an SIP video terminal fundamentally provides videophone service using SIP.

Video-support adaptor 1 sends a session setup request message (i.e., an INVITE message) to a PBX (step S601). The PBX checks video media information of video-support adaptor 1 and audio media information of the first voice-call terminal (step S602).

Moving picture media information checked by the PBX in step S602 is as follows. In order to transfer audio data, the PBX converts a circuit-based signal received from the first voice-call terminal into packet data. The audio media information checked in step S602 indicates information of the audio media data to be converted into packet data by the PBX. Meanwhile, the video media information of step S602 indicates video media information supported by video-support adaptor 1.

Subsequently, the PBX sends a session setup request message to the SIP video-call terminal (step S603). In this regard, the PBX sends a message expressed as "INVITE sip:2002@SIPE-PBX." Needless to say, the session setup request message of step S603 includes audio media information and video media information.

The SIP video-call terminal receiving the session setup request message sends a RINGING message, informing that a bell is ringing, to the PBX (step S604). In addition, when a user of the SIP video-call terminal responds to the message, the SIP video-call terminal sends a response message (i.e., a 200 OK message) to the PBX (step S605).

Subsequently, the PBX sends a response message (i.e., a 200 OK message) to video-support adaptor 1 in response to step S601 (step S606). The response message includes video media information of the SIP video-call terminal. Then, video-support adaptor 1 sends an ACK message to the PBX in response to the response message (step S607). In addition, the PBX sends the ACK message to the SIP video-call terminal (step S608), thereby completing session establishment.

Subsequently, audio media data are exchanged between the first voice-call terminal and the SIP video-call terminal via the PBX (step S609). In addition, video media data are exchanged between video-support adaptor 1 and the SIP video-call terminal (step S610).

Figure 7:
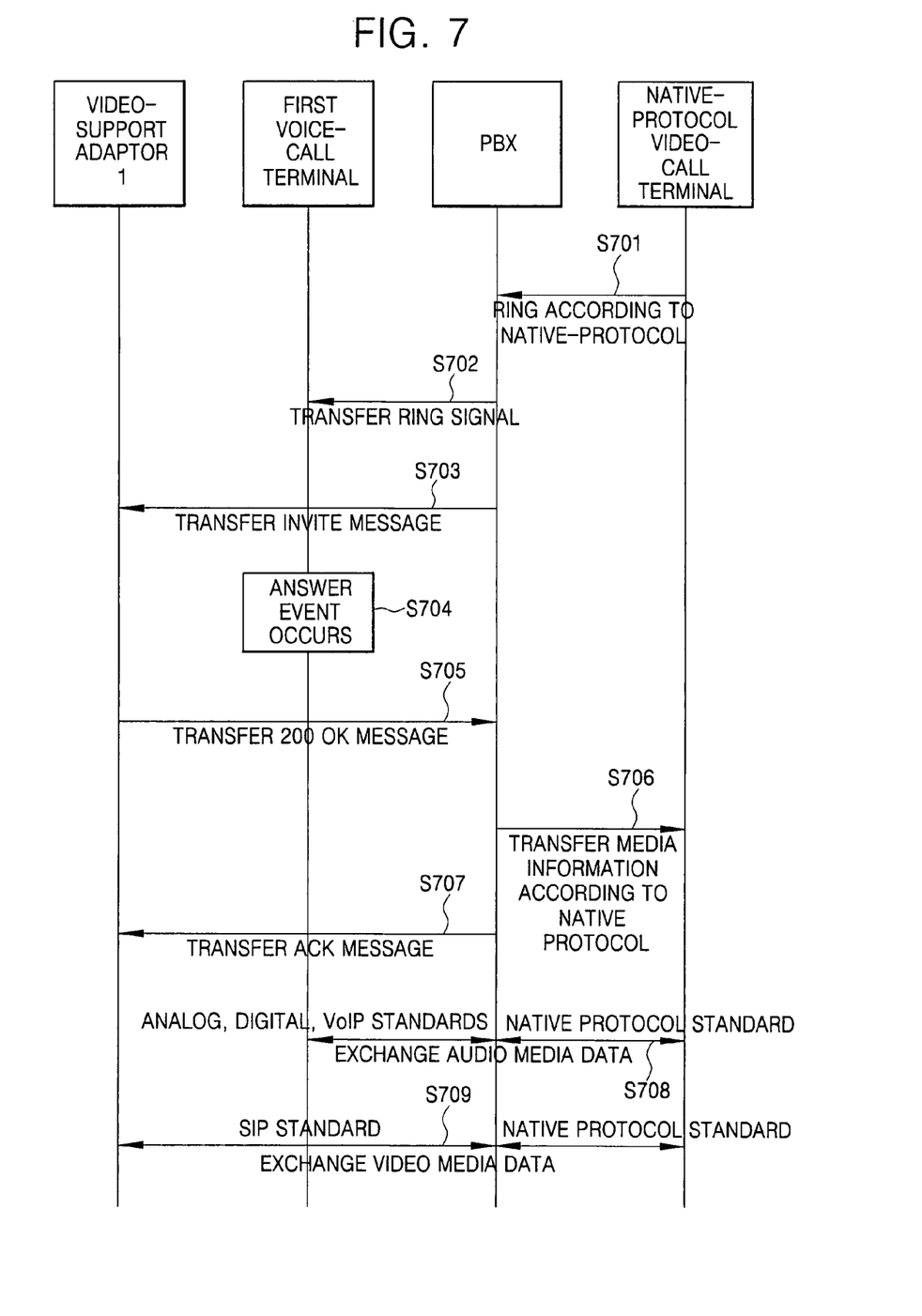
FIG. 7 is a flowchart of a method of establishing a session between a video terminal not supporting SIP and a terminal using a video-support adaptor according to yet another exemplary embodiment of the present invention.

FIG. 7 is a flowchart of a method of establishing a session between a video terminal not supporting SIP and a terminal using a video-support adaptor according to yet another exemplary embodiment of the present invention.

In contrast to FIG. 5, in this exemplary embodiment, a native-protocol video-call terminal corresponds to an originating terminal, and video-support adaptor 1 and a first voice-call terminal correspond to a destination terminal.

The native-protocol video-call terminal sends a ring signal according to its native protocol to a PBX (step S701). The ring signal has a different format from a session setup request message (i.e., an INVITE message) defined according to SIP.

Then, the PBX sends the ring signal to the first voice-call terminal (step S702). Step S702 also does not use SIP. In addition, the PBX sends a session setup request message (i.e., an INVITE message) for transferring video data to video-support adaptor 1 (step S703). The session setup request message includes video media information of the native-protocol video-call terminal.

When a user responds to the session setup request message at the first voice-call terminal, an answer event occurs (step S704), and video-support adaptor 1 sends a 200 OK message to the PBX (step S705). The 200 OK message includes video information of video-support adaptor 1.

The PBX receiving the 200 OK message in step S705 sends the video media information of video-support adaptor 1 to the native-protocol video-call terminal (step S706). Meanwhile, the PBX sends an ACK message in response to the 200 OK message to video-support adaptor 1 (step S707). By means of the above described process, a session for video-call service is established.

Then, audio media data are exchanged between the first voice-call terminal and the native-protocol video-call terminal via the PBX (step S708). In addition, video media data are exchanged between the video-support adaptor 1 and the native-protocol video-call terminal via the PBX (step S709).

Figure 8:
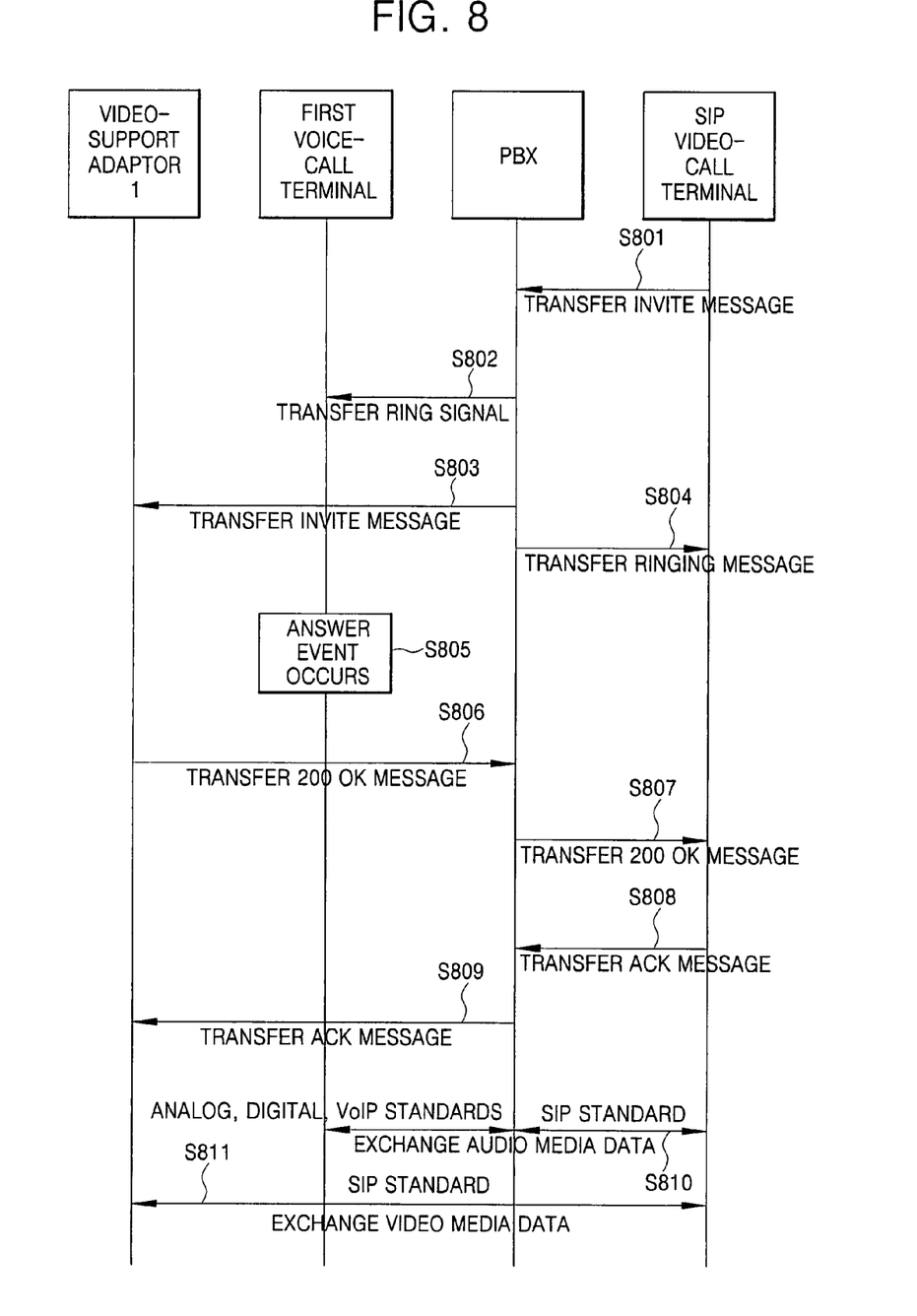
FIG. 8 is a flowchart of a method of establishing a session between an SIP terminal and a terminal using a video-support adaptor according to yet another exemplary embodiment of the present invention.

FIG. 8 is a flowchart of a method of establishing a session between an SIP terminal and a terminal using a video-support adaptor according to yet another exemplary embodiment of the present invention.

An SIP video-call terminal sends a session setup request message to a PBX (step S801).

Since a first voice-call terminal cannot process audio data using SIP, the PBX instead of the first voice-call terminal must process audio data. The PBX sends a ring signal to the first voice-call terminal (step S802).

Meanwhile, the PBX sends the session setup request message to video-support adaptor to establish a video session (step S803). The message includes video media information of the SIP video-call terminal. The session setup request message according to step S803 corresponds to "INVITE sip:2001@SIPE-PBX."

The PBX sends a RINGING message, reporting that the ring signal is being transferred to the first voice-call terminal, to the SIP video-call terminal (step S804).

When a user of the first video-call terminal responds to the ring signal according to step S802, an answer event occurs (step S805). When the answer event occurs, video-support adaptor sends a 200 OK message to the PBX (step S806). The 200 OK message includes video media information of video-support adaptor 1.

The PBX generates a 200 OK message, including information of audio media data to be generated by converting an audio signal transferred from the first voice-call terminal and video media information transferred from video-support adaptor 1, and transfers it to a second terminal, that is, the SIP video-call terminal (step S807). In response to the 200 OK message, the SIP video-call terminal sends an ACK message to the PBX (step S808). The PBX sends the ACK message to video-support adaptor 1 (step S809), thereby completing session establishment for a video call between the SIP video-call terminal and the first voice-call terminal together with video-support adaptor 1 (steps S810 and S811).

Figure 9:
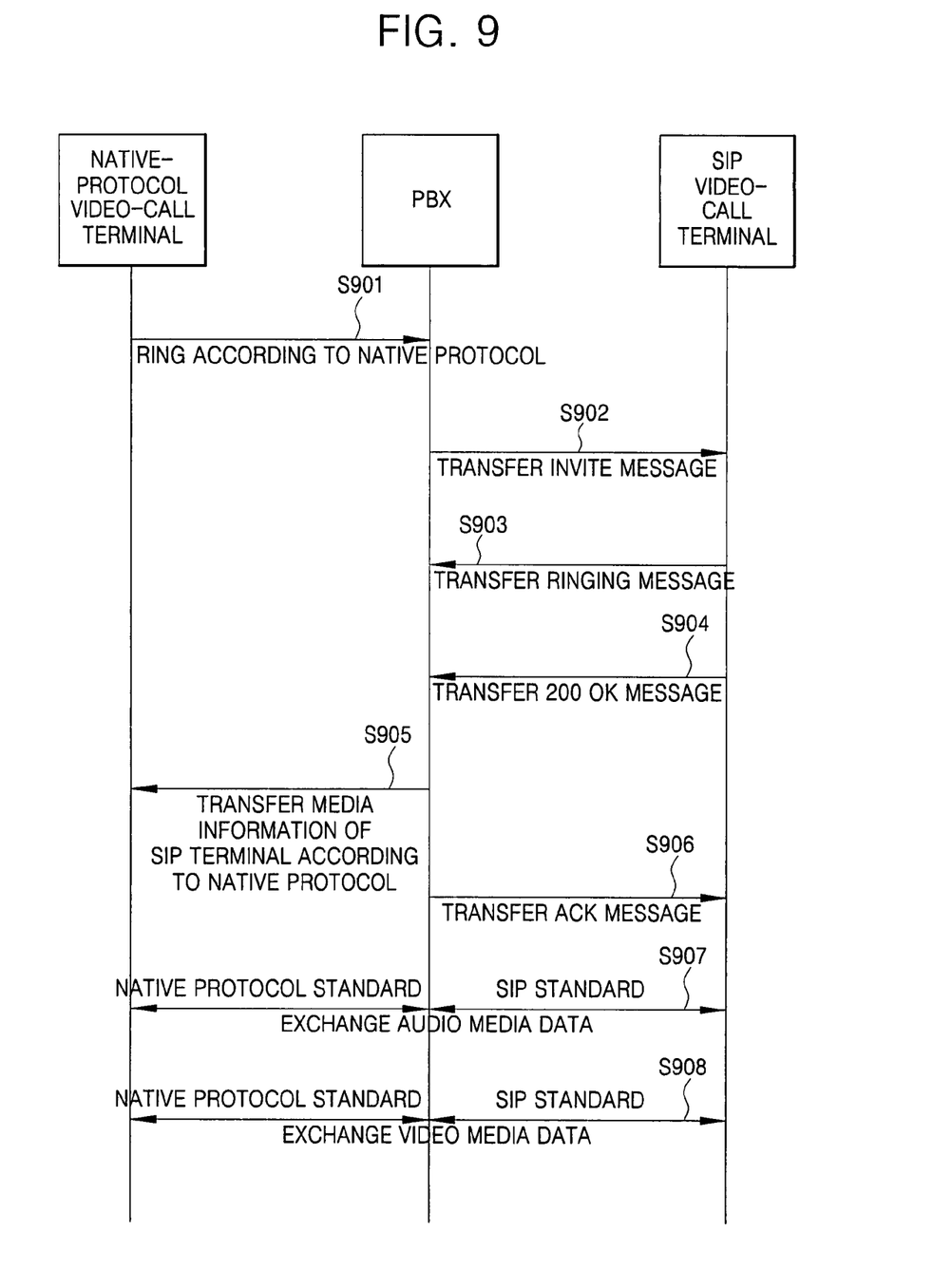
FIG. 9 is a flowchart of a method of establishing a session between a video terminal not supporting SIP and an SIP terminal according to yet another exemplary embodiment of the present invention.

FIG. 9 is a flowchart of a method of establishing a session between a video terminal not supporting SIP and an SIP terminal according to yet another exemplary embodiment of the present invention.

First, a native-protocol video-call terminal calls an SIP video-call terminal according to its native protocol (step S901). A PBX senses the videophone call from the native-protocol video-call terminal. The PBX generates a session setup request message, including audio and video media environmental information of the native-protocol video-call terminal stored in a database, and sends it to a second terminal, that is, the SIP terminal (step S902). The message can be expressed as "INVITE sip:2002@SIPE-PBX."

The SIP video-call terminal sends a RINGING message, reporting that a bell is ringing, to the PBX (step S903). When a user responds to the ringing, the second terminal sends a 200 OK message to the PBX (step S904). The 200 OK message includes audio and video media environmental information of the SIP video-call terminal.

The PBX sends the environmental information included in the 200 OK message to the native-protocol video-call terminal so that the native-protocol video-call terminal can transfer data according to audio and video data standards supported by the SIP video-call terminal (step S905). Step S905 is performed according to the native protocol.

Meanwhile, the PBX transfers an ACK message to the SIP video-call terminal in response to the 200 OK message (step S906). By means of the above described process, an audio and video rapid transport protocol (RTP) connection is established between the native-protocol video-call terminal not supporting SIP and the SIP video-call terminal (steps S907 and S908).

Figure 10:
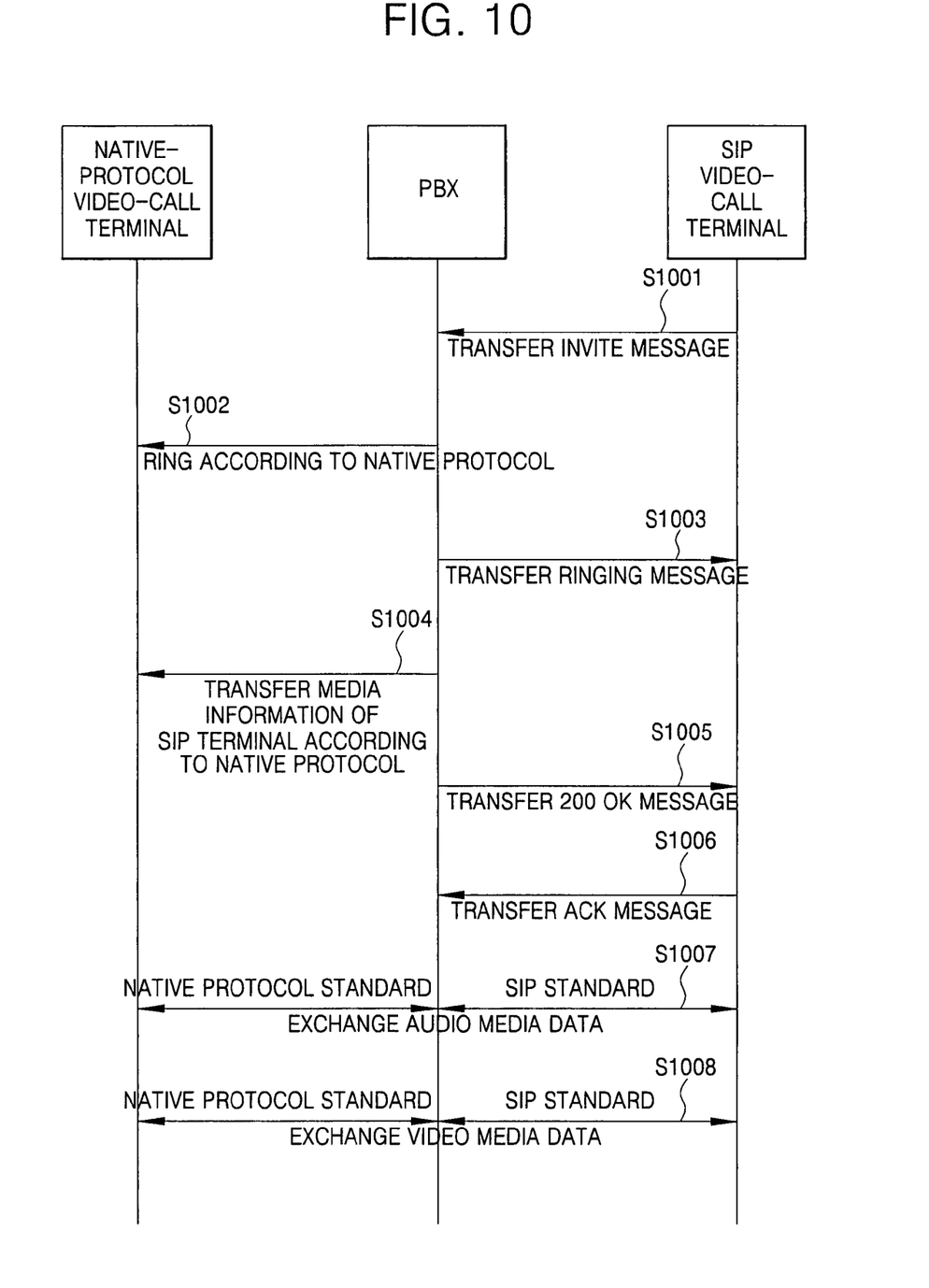
FIG. 10 is a flowchart of a method of establishing a session between an SIP terminal and a terminal not supporting SIP according to yet another exemplary embodiment of the present invention.

FIG. 10 is a flowchart of a method of establishing a session between an SIP terminal and a terminal not supporting SIP according to yet another exemplary embodiment of the present invention.

In contrast to FIG. 9, in FIG. 10 an SIP video-call terminal corresponds to an originating terminal, and a native-protocol video-call terminal not supporting SIP corresponds to a destination terminal.

The SIP video-call terminal sends a session setup request message, which requests the native-protocol video-call terminal for a video call, to a PBX (step S1001). The PBX recognizes that the destination terminal does not support SIP using a database, and sends a ring signal instead of the session setup request message to the native-protocol video-call terminal (step S1002). Simultaneously, the PBX sends a RINGING message, reporting ringing at the destination terminal, to the SIP video-call terminal (step S1003).

When a user responds to the ringing of the native-protocol video-call terminal, an answer event occurs at the PBX. In this regard, the PBX sends media information of the SIP video-call terminal for transferring audio and video media data to the native-protocol video terminal (step S1004). Meanwhile, the PBX sends a 200 OK message, including audio and video media information of the native-protocol video-call terminal, to the SIP video-call terminal (step S1005). Subsequently, the SIP video-call terminal sends an ACK message to the PBX, thereby completing session establishment (step S1006).

The native-protocol video-call terminal exchanges audio and video media data with the PBX, and the SIP video-call terminal also exchanges media data with the PBX (steps S1007 and S1008).

As described above, according to the present invention, it is possible to receive video-call service between a conventional terminal not having a video screen and various videophone apparatuses by interworking the conventional terminal with SIP-based video software or hardware.

While the present invention has been described with reference to exemplary embodiments thereof, it will be understood by those skilled in the art that various changes in form and detail may be made therein without departing from the scope of the present invention as defined by the following claims.

What is claimed is:

1. A method of providing video-call service using a Private Branch Exchange (PBX), the method comprising:
receiving, at the PBX, video media information from a video-support adaptor for providing video-call service to a voice-call terminal, the video media information being supported by the video-support adaptor;
checking and converting audio media information received from the voice-call terminal; and
transmitting, by the PBX, moving picture media information to be used by the voice-call terminal and the video-support adaptor to a video-call terminal to establish a session between the video-support adaptor and the video-call terminal.

2. The method of claim 1, further comprising:
relaying, at the PBX, video media data between the video-support adaptor and the video-call terminal; and
relaying, at the PBX, audio media data between the voice-call terminal and the video-call terminal.

3. The method of claim 1, wherein the moving picture media information to be used by the voice-call terminal and the video-support adaptor comprises the audio media information according to a format of audio packet data to be transferred by the PBX to the video-call terminal, and video media information according to a format of video media data provided by the video-support adaptor.

4. The method of claim 1, wherein the voice-call terminal comprises at least one of an analog voice telephone terminal, a digital voice telephone terminal, and a Voice over Internet Protocol (VoIP) voice telephone terminal.

5. The method of claim 1, wherein the video-call terminal comprises one of a terminal providing video-call service using Session Initiation Protocol (SIP) and a terminal providing video-call service using a native protocol.

6. The method of claim 1, wherein receiving, at the PBX, moving picture media information from the video-support adaptor comprises transferring, by the video-support adaptor to the PBX, a session setup request message comprising the video media information, the session setup request message being an INVITE message.

7. The method of claim 1, further comprising:
storing the moving picture media information to be used by the voice-call terminal and the video-support adaptor in a database at the PBX.

8. A method of providing video-call service using a Private Branch Exchange (PBX), comprising:
transferring, by a first video-support adaptor configured to interwork with a first voice terminal, to the PBX, a session setup request message, and transferring a ring signal by the PBX to a second voice terminal which is a destination terminal;
in response to receiving a response from the second voice terminal, transferring, by the PBX to the first video-support adaptor, moving picture media information of a second video-support adaptor configured to interwork with the second voice terminal; and
performing session establishment at the first video-support adaptor, together with the second video-support adaptor, using the moving picture media information.

9. The method of claim 8, wherein transferring the moving picture media information of the second video-support adaptor to the first video-support adaptor comprises transferring an alternative response message comprising the moving picture media information of the second video-support adaptor to the first video-support adaptor.

10. A method for providing videoconferencing service using a Private Branch Exchange (PBX), comprising:
receiving, at the PBX, video media information from a video-support adaptor for providing video-call service to a voice-call terminal;
transferring, by the PBX to a multimedia conference (MMC) server, a Session Initiation Protocol (SIP) message comprising moving picture media information to be used by the video-support adaptor; and
relaying, at the PBX, video media data between the video-support adaptor and the MMC server, and audio media data between the voice-call terminal and the MMC server.

11. A Private Branch Exchange (PBX) for providing video-call service, comprising:

a call processor to check and convert audio media information received from a voice-call terminal, to check video media information supported by a video-support adaptor, to provide video-call service to the voice-call terminal, and to transmit the audio media information and the video media information; and a Session Initiation Protocol (SIP) agent to receive the transmitted audio media information and the transmitted video media information, and to transmit moving picture media information, to be used by the voice-call terminal and the video-support adaptor, to a counterpart terminal to establish a session between the video-support adaptor and the counterpart terminal.

12. The PBX of claim 11, further comprising:
a terminal register to register the voice-call terminal provided with the video-call service through the video-support adaptor using SIP.

13. The PBX of claim 12, further comprising:
a terminal information database to store the moving picture media information of the voice-call terminal provided with the video-call service through the video-support adaptor.

14. The PBX of claim 11, wherein the call processor is configured to establish only a voice-call session between the voice-call terminal and the counterpart terminal when the counterpart terminal does not support video-call service.

15. The PBX of claim 11, wherein the SIP agent is configured to exchange the moving picture media information to be used by the voice-call terminal and the video-support adaptor in at least one of a session setup request message, a 200 OK message, and a 380 alternative response message, and to transmit said at least one of the session setup request message, the 200 OK message, and the 380 alternative response message, comprising the moving picture media information, to the counterpart terminal.

16. The PBX of claim 11, wherein the call processor is configured to exchange audio data with a terminal not supporting SIP, and the SIP agent is configured to exchange audio data with a terminal supporting SIP using SIP, and a voice call is performed between the terminal not supporting SIP and the terminal supporting SIP.

17. The PBX of claim 11, wherein the PBX is configured to transmit video media information of a SIP terminal to the video-support adaptor, and the video-support adaptor is configured to receive the video media information.

18. The PBX of claim 11, wherein the PBX is configured to exchange the video media information with the video-support adaptor to provide the video-call service to the voice-call terminal.

* * * * *